April 14, 1964     J. H. WATSON     3,129,413

IRRIGATION SIGNAL DEVICE

Filed Aug. 27, 1962

Jere H. Watson
INVENTOR.

BY *Clarence A. O'Brien*
*and Harvey B. Jacobson*
Attorneys

United States Patent Office 3,129,413
Patented Apr. 14, 1964

3,129,413
IRRIGATION SIGNAL DEVICE
Jere H. Watson, Yuma, Ariz.
(821 Centinela Ave., Inglewood, Calif.)
Filed Aug. 27, 1962, Ser. No. 219,621
12 Claims. (Cl. 340—235)

This invention relates to an irrigation signal system in connection with agricultural areas requiring irrigation.

The irrigation signal system of the present invention is particularly useful in connection with fields wherein water is brought thereto by canals raised above the level of the surrounding land. The flow of water onto the irrigated land is accordingly controlled by a gate or gates so that when the appropriate amount of water has passed through the gate into the field, the gates may be closed and water in the canal diverted to other portions of the land or other fields. The water thus diverted ultimately saturates the soil. The irrigated field may be farmed to row crops by which raised rows of soil are formed with furrows separating the rows by which method the water flows in the furrows, between the rows and is absorbed by the soil forming the rows, passing upward to the plants by osmosis or may be farmed to crops planted in flat fields surrounded by raised borders of earth which contain the irrigation water and hold it on the irrigated field.

Heretofore a continuous patrol of the irrigated fields has been required to determine the distance at which the irrigation water has passed between the rows or the distance which the water has reached in passing over a flat field. Such patrol is required by the necessity to close the gate admitting the water to the irrigated field before the water has passed to the end of the field for the reason that the water in the portion of the field nearest the gate has built up or accumulated in such a manner that it continues to flow to the end of the field at the greatest distance from the gate after the gate is closed admitting no more water. The patrol of the field therefore, heretofore has taken place out in the irrigated crops attempting to locate the flow of irrigation water visually at the point of maximum distance from the gate. In addition heretofore a continuous patrol of the earth borders surrounding a field has been required in order to determine if the irrigation water has broken the borders and begun to pass out of the land to be irrigated. The canals bringing water to the lands to be irrigated have heretofore been continuously patrolled to determine the presence of breaks in the canals or damage to the canals sometimes caused by burrowing animals which can cause over irrigation and serious damage to crops. In order to save time and manpower in connection with such patrolling of the canals, various irrigation signalling systems have been devised which are either insufficient to supply all of the information needed in connection with the proper irrigation or involve complicated and complex mechanisms which in addition to prohibitive costs are subject to break down and hence not very reliable. It is therefore a primary object of the present invention to provide an irrigation signal system which is extremely simple in construction and arrangement, economical in cost, reliable and able to furnish all of the information needed in connection with the proper irrigation of a field. All other irrigation signal systems heretofore devised give a visual signal. It is the object of this invention to provide not only a visual signal but an audible signal as well.

Another object of the present invention is to provide irrigation signal systems adapted to be properly positioned during the daytime and to provide proper signalling at night when water is admitted to the irrigation canals.

A further object of the present invention is to provide an irrigation signalling device which consists of a standard adapted to be embedded at any desired location in the ground mounting thereabove a signal lamp and/or an electric horn mounting at any desired level on the standard, a water immersion battery of the type that is activated when water is absorbed. Accordingly, the irrigation signalling device of the present invention is utilized to both indicate the presence of water which has reached a desired height above the ground and also water which has saturated the soil to the point desired to be determined by the irrigator.

The present invention may also be utilized to indicate the presence of water outside borders or outside canals, thereby indicating breaks or damage to the border or canal.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
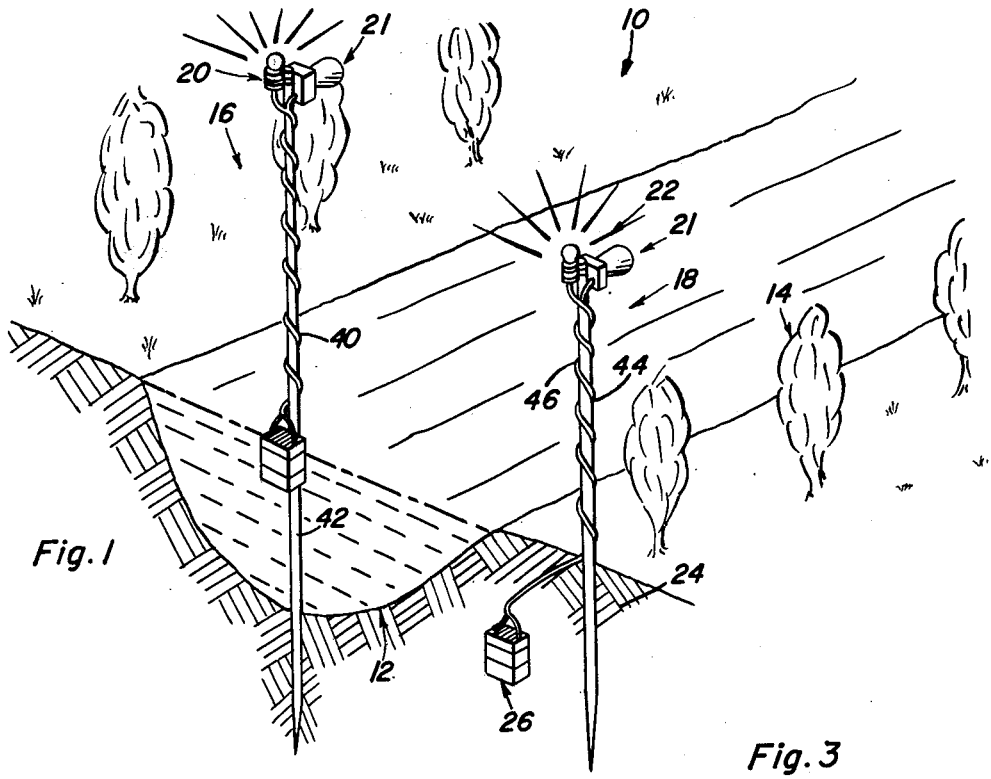
FIGURE 1 is a sectional perspective view of a typical installation of the irrigation signalling device of the present invention.

Referring now to the drawings in detail, FIGURE 1 illustrates an agricultural field generally referred to by reference numeral 10 having irrigation canals 12 running therethrough between rows of plants 14. Two types of signalling devices 16 and 18 are shown in operative relation. Thus, the signalling device 16 will be mounted at a desired location during the daytime within the canal 12 while the signalling device 18 will be located in spaced relation to the canal. Each of the signalling devices extend above the rows of plants 14 by different amounts so as to distinguish therebetween and also to permit viewing of the lamp devices 20 and 22 from the other end of the field during the night time in order to indicate the presence of water at a desired level within the canal 12 and seepage of water to the soil 24 from the canal. Each of the signal devices 16 and 18 therefore, has associated therewith an immersion type battery generally referred to by reference numeral 26 adapted to be activated by water so as to provide an energizing current for the lamps 20 and 22 mounted atop of the signal devices.

Figure 3:
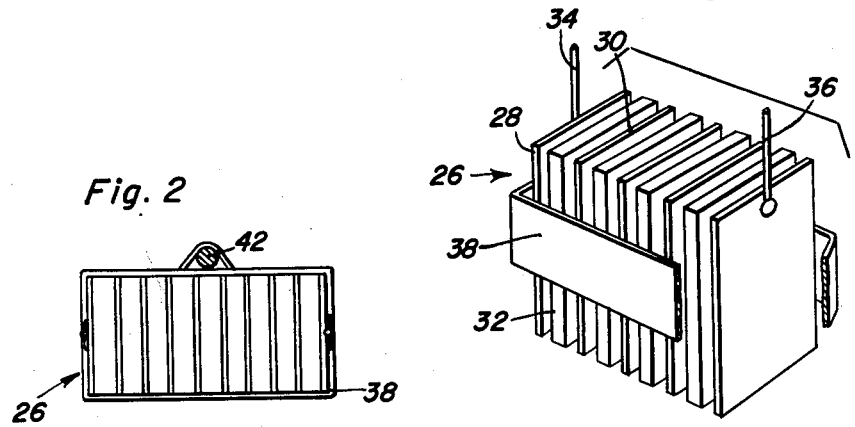
FIGURE 3 is a disassembly perspective view with parts broken away of the immersion battery.
Figure 2:
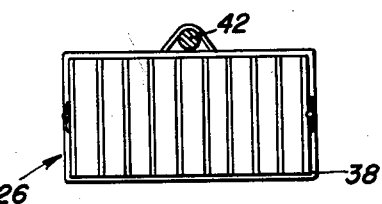
FIGURE 2 is a top plan view of the immersion battery utilized in connection with the signalling device.

Referring now to FIGURES 2 and 3 in particular, it will be observed that each of the batteries 26 is of the type commercially available in a dry condition, that is with no electrolyte present so that the battery may be activated by immersion in water. The battery thus includes a plurality of positive electrode plates 28 usually consisting of a porous cuprous chloride deposited on a metal screen spaced from a negative electrode plate 30 made of a thin sheet of magnesium by a separator pad 32 adapted to absorb and hold a predetermined quantity of water as the electrolyte. The lead from a pair of conductors 34 and 36 are therefore directly connected to the positive and negative electrode plates 28 and 30 so as to immediately conduct a flow of current when water is absorbed by the pads 32. Inasmuch as the type of battery with which the signalling devices are associated, are adapted to provide energizing current for prolonged periods of time, the batteries 26 are either cut down to size from commercially available batteries or constructed with such dimension as to provide a flow of current for a short duration of time when the separator pad 32 receives a predetermined quantity of water. In this manner, the signal provided by the signalling device will be extinguished within a short period of time after water has receded from the battery. The conductor leads 34 and 36 are therefore directly connected to the electrode plates so that ignition of the signalling lamp will occur immediately, the electrode plates and pads being held in assembled relation by an embracing band 38.

Figure 4:
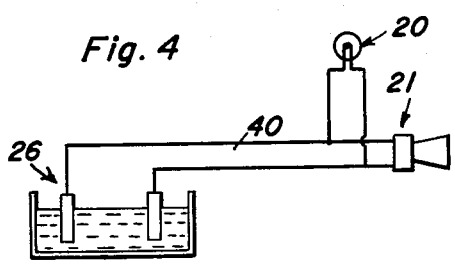
FIGURE 4 is a circuit diagram of a signalling device.

Referring to FIGURES 1 and 4, it will be observed that conductor leads from the battery form an electrical cable 40 entwined about the canal marking standard 42 to which the battery is secured at a desired level. The electrical cable 40 thus connects the battery to the lamp device 20 and a horn device 21 mounted on top of the standard 42. When water is admitted to the canal 12, upon reaching a predetermined level, the battery will be activated to illuminate the lamp 20 and sound the horn. If on the other hand some break in the canal should occur so that water at a predetermined level never contacts the battery on the standard 42, no signal will be produced. A plurality of water flow signalling devices 16 are therefore provided at desired locations remotely located from said observing station from which the irrigator may locate the trouble without having to patrol the entire field.

The height of the signalling devices 16 with the lamp mounted thereabove, is therefore selected so as to be viewed from the desired distance.

The saturation signalling devices 18 on the other hand are mounted within the soil in spaced relation to the canal so that the batteries associated therewith may be embedded below the surface of the soil 24 and become activated when water has saturated the soil in sufficient quantity so as to be absorbed by the battery. The signalling device 18 is also provided with a standard 44 about which the electrical cable 46 is entwined for electrically connecting the battery 26 to the lamp device 22. The lamp device is therefore located above the plants 14 a height distinguishable from the lamp 20 on the signalling device 16 so as to provide the irrigator with a visual indication of the seepage condition.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An irrigation signal system for a field having water flowing on top of soil comprising, a flow indicating standard and a saturation indicating standard both supported in the soil spaced from each other and projecting above plants growing in the field for viewing from a remote location, signalling means mounted on each of said standards, and immersion batteries electrically connected to each of said signalling means for energization thereof in response to absorption of water, said batteries being mounted on said standards at levels above and below the surface of the soil respectively to provide signals indicating the presence of water on top of the soil and saturation thereof by the water.

2. The combination of claim 1, wherein each of said batteries is formed by electrode plates separated by separator pads absorbing a predetermined quantity of water as an electrolyte, said plates and pads being dimensioned to produce energizing current for each lamp for a short period of time from supply thereto of said predetermined quantity of water.

3. The combination of claim 2, wherein a pair of said battery electrode plates are directly connected by conductors entwined about an associated standard to the lamp mounted thereabove for rapid ignition in response to absorption of water by the pads.

4. The combination of claim 3, wherein an embracing band secures one of said batteries to said flow indicating standard at a desired level.

5. The combination of claim 1, wherein an embracing band secures one of said batteries to said flow indicating standard at a desired level.

6. An irrigation signal system for irrigated fields, comprising an irrigation signal standard situated at a point within the field at which it is desired to be informed of the degree of saturation of the soil by the irrigation water flowing in such field, said signal standard projecting above the surrounding crops a sufficient height to be seen at a distance, an electric lamp and an electric horn mounted adjacent the top of the standard, and an immersion battery electrically connected to the lamp and horn, for energization thereof in response to absorption of water, said battery being secured to said standard at a desired level above the soil to provide a signal indicating the presence of irrigation water at a predetermined depth equal to the height of the battery above the soil.

7. The combination of claim 6, wherein said battery is formed by separator pads absorbing a predetermined quantity of water as an electrolyte, said plates and pads being dimensioned to produce energizing current for each lamp for a short period of time from supply thereto of said predetermined quantity of water.

8. The combination of claim 7 wherein a pair of said battery electrode plates are directly connected by conductors entwined about an associated standard to the lamp mounted thereabove for rapid ignition in response to absorption of water by the pads.

9. The combination of claim 8 wherein an embracing band secures said battery to the canal marking standard at a desired level.

10. An irrigation signal system for fields upon which irrigated crops are grown, comprising an irrigation signal standard supported in the soil and projecting above the crops, an electric signalling means mounted on the top of the standard and an immersion battery electrically connected to the signalling means for energization thereof in response to absorption of water, said battery being mounted adjacent said standard and below the surface of the soil to indicate saturation of the soil by irrigation water.

11. The combination of claim 10 wherein said battery is formed by separator pads absorbing a predetermined quantity of water as an electrolyte, said plates and pads being dimensioned to produce energizing current for signalling means for a short period of time from supply thereto of said predetermined quantity of water.

12. The combination of claim 11, wherein a pair of said battery electrode plates are directly connected by conductors entwined about an associated standard to the lamp mounted thereabove for rapid ignition in response to absorption of water by the pads.

No references cited.